United States Patent Office 3,428,676
Patented Feb. 18, 1969

3,428,676
SYNTHESIS OF CYCLIC PHOSPHONITRILES
Janet H. Smalley, Irwin, Pa., assignor to Armstrong Cork Company, Lancaster, Pa., a corporation of Pennsylvania
No Drawing. Filed Jan. 31, 1964, Ser. No. 341,740
U.S. Cl. 260—543
Int. Cl. H01b 3/30; C07d 105/02
4 Claims This invention is directed to a new method of making a cyclic phosphonitrile of the formula

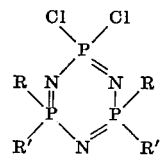

and more particularly relates to a method of effecting ring closure of quasiphosphonium compounds of the formula

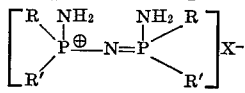

where X is halogen.

The quasiphosphonium compounds with which this invention is concerned and their method of preparation are more fully described in U.S. Patent 3,080,422 to Bezman and Smalley. As described therein, R and R' are preferably members selected from the class consisting of a phenyl radical of the formula

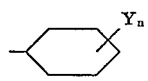

where Y is a radical selected from the group consisting of methyl, methoxy, cyano, thiocyano, isothiocyano, dialkylamino having 1 to 4 carbon atoms in the alkyl groups, nitro and halogen and $n$ is an integer from 1 to 5. Thus, examples of R and R' are chlorophenyl, dimethylaminophenyl, dibutylaminophenyl, tolyl, fluorophenyl and dinitrophenyl.

In accordance with this invention, ring closure of the quasiphosphonium compound is effected by reacting the quasiphosphonium compound with phosphorus pentachloride in a refluxing organic solvent. Solvents which are unreactive with phosphorus pentachloride or the quasiphosphonium compound, preferably aromatic or aliphatic hydrocarbons containing halogen or other polar groups, are suitable media for the ring closure reaction and may be used singly or as mixtures. Illustrative examples are: bromobenzene, chlorobenzene, benzene, toluene, xylene, nintrobenzene, and tetrachloroethane. In effecting the subject reaction, one precaution must be observed. Thus, as disclosed in U.S. Patent 3,080,422, herein before referred to, thermal treatment of the quasiphosphonium compounds will cause decomposition resulting in conversion to ring phosphonitrile structures in which the yield is predominantly of the cyclic phosphonitrile tetramer. In order to obtain good yields of the cyclic tetraphenyldichlorotriphosphonitrile it is necessary that the reaction between the quasiphosphonium compound and the phosphorus pentachloride be accomplished under conditions such that appreciable decomposition of the quasiphosphonium compound does not occur, and most particularly that reaction temperatures be kept below 250° C. Accordingly, the reaction tempearture may be varied between 50° C. and 250° C. by the appropriate selection of a solvent or solvent or solvent mixture. Although the ring closure reaction can be effected within a broad temperature range, the preferred temperature range is from 80° C. to 160° C. since the yield of tetraphenyldichlorotriphosphonitrile and the time required for complete reaction are determined by the reaction temperature. Thus, when a higher boiling solvent or solvent mixture is employed, the yield of tetraphenyldichlorotriphosphonitrile is somewhat reduced, whereas a lower boiling solvent or solvent mixture will give higher product yields but require longer reaction time.

The following examples will serve to illustrate the invention more fully.

EXAMPLE 1

To 150 milliliters of purified bromobenzene was added 2.08 grams of phosphorus pentachloride and 4.52 grams of the quasiphosphonium compound of the formula

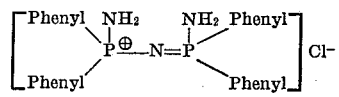

The resultant solution was refluxed at 156° C. for 6 hours under a blanket of nitrogen until the evolution of gaseous hydrogen chloride was virtually complete. The turbid reaction mixture was then filtered hot to remove the small quantity of ammonium chloride formed by the minor decomposition reaction which occurred under the present condition as illustrated below:

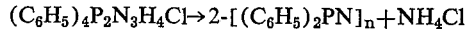

The solvent was removed from the clear filtrate by distillation at reduced pressure and the tacky solid residue was extracted repeatedly with hot petroleum ether. By concentration of the petroleum ether solution, 1.86 grams, a yield of 36.2%, of the trimeric phosphonitrile of the formula

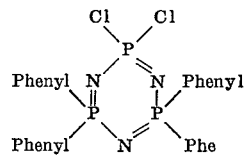

was obtained. One recrystallization from petroleum ether gave the analytical sample having a melting point of 144.5 to 145.5° C. (Fisher-Johns block).

Analysis.—Calculated for $C_{24}H_{20}P_3N_3Cl_2$: C, 56.05; H, 3.92; P, 18.07; N, 8.17; Cl, 13.79; molecular weight, 514. Found: C, 56.29; H, 4.07; P, 17.58; N, 8.26; Cl, 13.75; molecular weight (ebulliometric measurements in benzene), 511.

The cyclic compound formed as above described gave an infrared spectrum identical to the known compound, tetraphenyldichlorotriphosphonitrile, having a melting point of 142 to 143° C. (capillary tube), prepared by Friedel-Crafts reaction on hexachlorotriphosphonitrile. That both chlorine atoms are attached to the same phosphorus atom in this compound has been confirmed by hydrolytic degradation.

0.36 gram of the cyclic phosphonitrile tetamer,

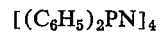

the major product formed by the decomposition of the phosphonium compound was obtained from the petroleum ether insoluble residue by fractional crystallization from benzene. The remaining brittle solid was predominantly a mixture of chain and cyclic polymers having the general formula $[(C_6H_5)_4Cl_2P_3N_3]_n$, some of which may be end-stopped by units of phosphorus pentachloride or hydrogen chloride.

A mixture of 1.81 grams of tetraphenyldichlorotriphosphonitrile, produced in accordance with the reaction of Example 1, and 0.803 gram of Bisphenol-A were ground together and transferred to a side-arm Pyrex glass tube which was heated in an oil bath. A slow stream of dry nitrogen was swept through the mixture by means of a capillary tube, and the exit gases were led through a solution of 0.100 N sodium hydroxide in order to measure the hydrochloric acid eliminated by the expected condensation reaction. The mixture was heated slowly and at 160° C., a complete melt was formed which was transparent and light yellow in color. After about 16 hours at 180 to 195° C., about 50% of the theoretical HCl had been eliminated. The temperature was then raised to about 235° C. in order to eliminate more HCl, but the rate of elimination was so slow that the reaction was terminated. The product was not completely soluble in acetone, butyl alcohol, or dimethylformamide, although, in each solvent, some solution took place and the remaining insoluble material was swelled and gel-like. A quantity of the solid reaction product, finely ground, was placed on sheet copper which was then heated. At 150 to 160° C. the polymer began to soften and flow. The copper was heated up to 300° C. during which process the polymer flowed out into a film. It had a high electrical resistance and is useful as an insulating coating for electrical systems exposed to elevated temperatures. A thermogram of the product indicates no weight loss up to a temperature of 400° C. Total weight loss is approximately 42% after being held at 500° C. for about one hour.

I claim:
1. The method of preparing a cyclic trimeric phosphonitrile of the formula

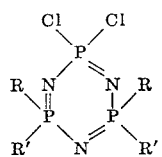

comprising reacting a quasiphosphonium salt of the formula

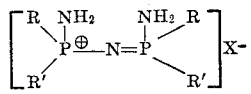

where X is halogen and R and R' are members selected from the class consisting of phenyl, dinitrophenyl and a substituted phenyl of the formula

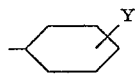

where Y is a member selected from the group consisting of methyl, methoxy, cyano, thiocyano, isothiocyano, dialkylamine having no more than 4 carbon atoms in the alkyl groups, nitro and halogen; with phosphorus pentachloride at a temperature less than about 250° C.

2. The method in accordance with claim 1 in which said quasiphosphonium salt and phosphorus pentachloride are reacted in a refluxing organic solvent.

3. The method of preparing tetraphenyldichlorotriphosphonitrile of the formula

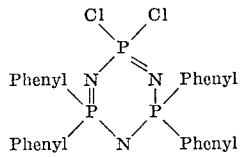

comprising reacting the quasiphosphonium salt

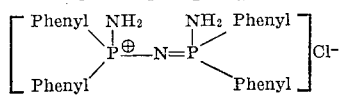

with phosphorus pentachloride at temperature less than about 250° C.

4. The method in accordance with claim 3 in which the quasiphosphonium salt and phosphorus pentachloride are reacted in a refluxing organic solvent.

References Cited
UNITED STATES PATENTS

| | | | |
|---|---|---|---|
| 3,121,704 | 2/1964 | Rice et al. | 260—54 |
| 2,866,773 | 12/1958 | Redfarn | 260—47 |
| 3,194,787 | 7/1965 | Redfarn | 260—47 |
| 3,234,273 | 2/1966 | Rice | 260—543 |

OTHER REFERENCES
Ahaw et al., Chem. and Ind., 1960, 1189–90.

WILLIAM H. SHORT, *Primary Examiner.*

M. GOLDSTEIN, *Assistant Examiner.*

U.S. Cl. X.R.

260—47, 465

UNITED STATES PATENT OFFICE
CERTIFICATE OF CORRECTION

Patent No. 3,428,676 February 18, 1969

Janet H. Smalley

It is certified that error appears in the above identified patent and that said Letters Patent are hereby corrected as shown below:

Column 1, line 29, after "radical" insert -- and a substituted phenyl radical --; line 35, "dialkylamino" should read -- dialkylamine --; line 64, "tempearture" should read -- temperature --; line 66, cancel "or solvent". Column 2, line 36, "Phe" should read -- Phenyl --.

Signed and sealed this 24th day of March 1970.

(SEAL)

Attest:

Edward M. Fletcher, Jr.

Attesting Officer

WILLIAM E. SCHUYLER, JR.

Commissioner of Patents